No. 844,103. PATENTED FEB. 12, 1907.
G. V. DAVIS.
FEED MECHANISM FOR BALING PRESSES.
APPLICATION FILED AUG. 1, 1906.
2 SHEETS—SHEET 1.
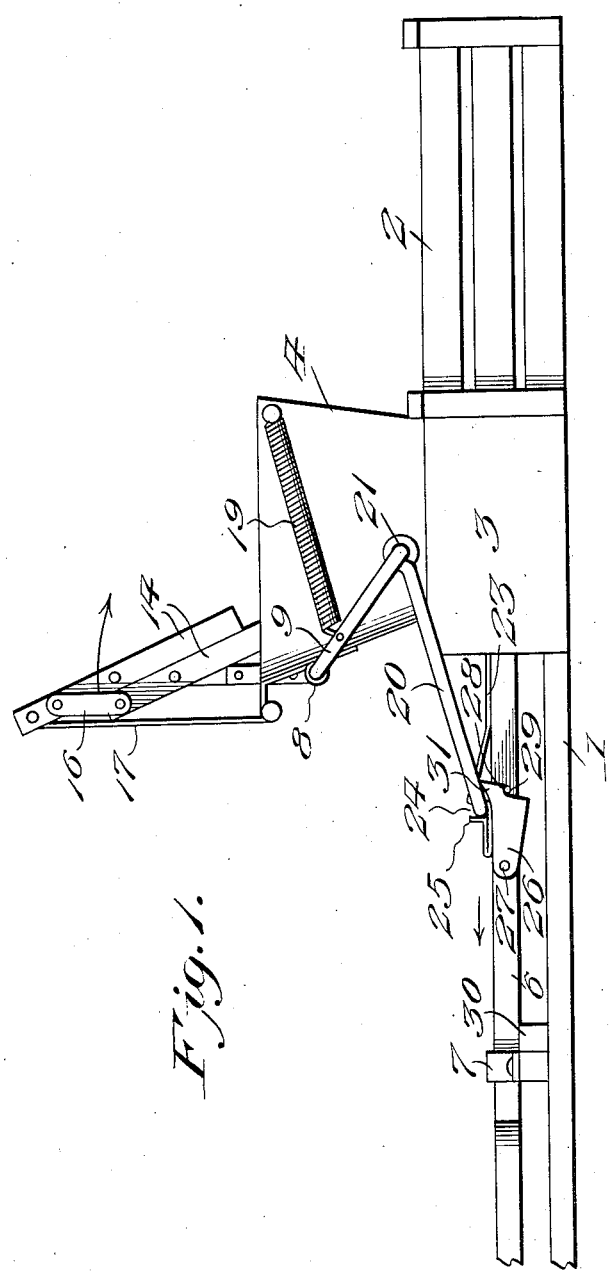
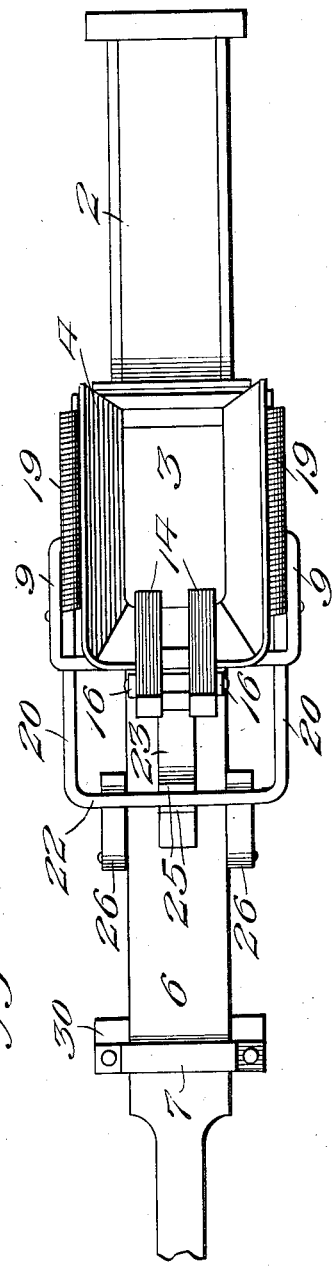
Witnesses
Edwin G. McKee
C. C. Hines
Inventor
Gilman V. Davis
By Victor J. Evans
Attorney No. 844,103.
PATENTED FEB. 12, 1907.
G. V. DAVIS.
FEED MECHANISM FOR BALING PRESSES.
APPLICATION FILED AUG. 1, 1906.
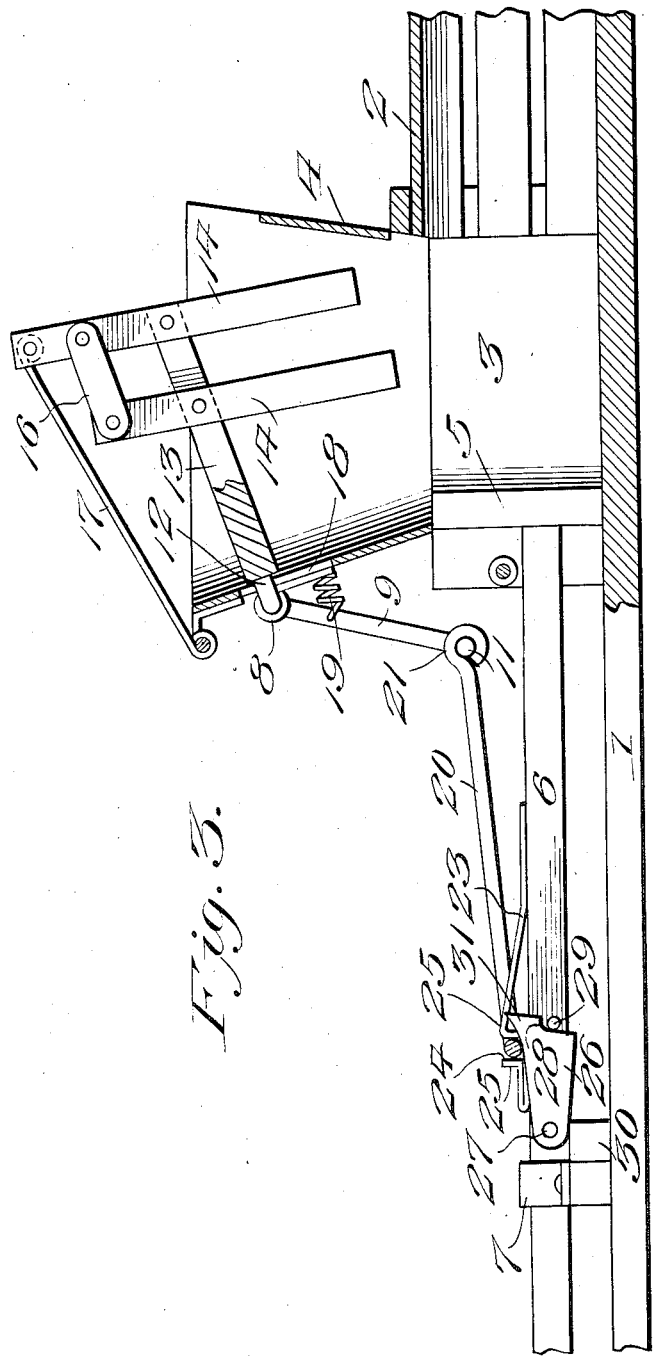
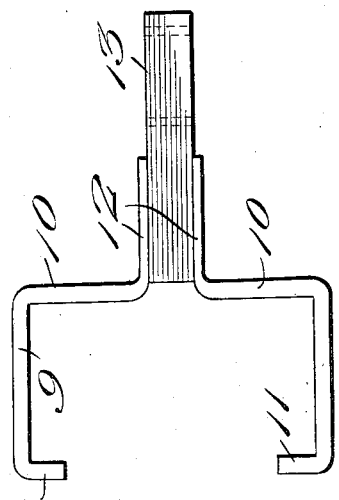
Witnesses
Edwin G. McKee
C. C. Hines
Inventor
Gilman V. Davis
By Victor J. Evans
Attorney

UNITED STATES PATENT OFFICE.

GILMAN V. DAVIS, OF ATKINSON, NEBRASKA.

FEED MECHANISM FOR BALING-PRESSES.

No. 844,103.  Specification of Letters Patent.  Patented Feb. 12, 1907.

Application filed August 1, 1906. Serial No. 328,781.

*To all whom it may concern:*

Be it known that I, GILMAN V. DAVIS, a citizen of the United States of America, residing at Atkinson, in the county of Holt and State of Nebraska, have invented new and useful Improvements in Feed Mechanism for Baling-Presses, of which the following is a specification.

This invention relates generally to improvements in baling-presses, and particularly to a feeding and packing mechanism therefor, whereby loose hay thrown into the hopper may be forced into the baling-chamber in advance of the plunger prior to being compressed thereby.

The object of the invention is to provide a simple and effective type of feed mechanism which is operated by the plunger and automatically thrown into and out of action at proper periods.

With the above and other objects in view the invention consists of the novel construction and combination of parts hereinafter fully described and claimed, reference being had to the accompanying drawings, in which—

Figure 1 is a side elevation of a baling-press embodying my invention, showing the feeder in retracted position. Fig. 2 is a top plan view of the same. Fig. 3 is a vertical longitudinal section showing the feeder as it appears just after the beginning of its working stroke and just prior to the completion of its return stroke. Fig. 4 is a plan view of the carrier-yoke.

Referring to the drawings, the numeral 1 designates the frame of a suitable type of baling-press having a compressing-chamber 2, with the mouth 3 of which communicates a superposed hopper or feed-chamber 4.

5 designates the compressing-plunger, and 6 the plunger rod or bar, which slides longitudinally in a suitable guide 7.

Fulcrumed in bearings 8, at the rear of the hopper, is a yoke 9, preferably constructed, as shown in Fig. 4, of a pair of angular members 10, provided at their lower ends with trunnions or journals 11 and having their upper ends bent to form attaching members 12, between which is arranged the rear end of a carrier-bar 13, which is bolted or otherwise suitably fastened thereto. To the forward end of the bar are pivotally connected feed bars or fingers 14, which are pivotally joined at their upper ends by links 16, two pairs of such fingers being preferably employed, one arranged in advance of the other, the upper ends of the forward pairs being pivotally connected with the hopper by a swinging brace-link 17, whereby the fingers are guided to move in a determined path without material deflection and are stayed in their feeding and bracing action. The arms or members 12 of the yoke are freely movable in a slot 18, formed in the rear wall of the hopper, thus allowing the fingers 14 to swing in an arc through the hopper to the position shown in Fig. 1 and from such position down into the upper end of the mouth 3 of the baling-chamber to force the loose hay thrown into the hopper therein in the path of the plunger 5 prior to its compression by said plunger.

When the fingers are in retracted position, the operating-arms of the yoke 9 extend at a downward and forward angle on opposite sides of the hopper, and said arms are attached to the hopper by coiled springs 19, which serve to retract the feed mechanism as a whole. To the trunnions, at the lower ends of the operating-arms of the yoke, are pivotally connected a connecting-rod or link 20, whereby the yoke is adapted to be coupled to the plunger rod or bar 6. In the construction disclosed the link or connecting-rod 20 is shown in the form of a bail, the free ends of the arms of which are provided with bearings 21, pivotally engaging the trunnions 11. The cross portion 22 of this bail-shaped link or connecting-rod is adapted for engagement with a catch carried by the plunger rod or bar 6, said catch being in the form of a metallic strip 23, secured to said rod or bar and bent to form a keeper-recess 24, having spring clamping-jaws 25. Arranged on opposite sides of the bar 6 are releasing-dogs 26, each dog being pivoted at its rear end to the bar, as indicated at 27, and provided at its forward end with a shoulder 28, adapted to engage a stop-pin 29 on the bar, whereby the downward swinging movement of the dog is limited. The lower surface of the dog is inclined and is adapted on the return movement of the bar 6 to ride over upon a retracting member 30, arranged on the frame 1 adjacent to the guide 7, the action of which member lifts the dog to throw the portion 22 of the connecting-rod 20 out of engagement with the jaws 25. As shown, each dog is provided with a nose or engaging portion 31, having its upper face inclined to engage and exert an upward pressure on the part 22 when said dog is tilted upwardly by the member 30, thus insuring the forcible release of the connecting-rod from the catch on the return stroke of the plunger.

Fig. 1 shows the retracted position of the parts of the feeder, which position they occupy when the plunger is at the limit of its working stroke. When the plunger moves rearwardly, the connection 21 is drawn upon to swing the yoke against the resistance of the springs 19, whereby motion is communicated to throw the feeding-fingers downward to force the hay from the hopper into the mouth 3 of the baling-chamber, the fingers 14 acting to press the hay into the mouth at the time the plunger reaches its fully-retracted position, as shown in Fig. 3. At this time the inclined lower surface of the dogs 26 come into contact with the retracting elements 30 and are lifted thereby, thereby throwing the connecting-rod 20 out of engagement with the latch and releasing it from engagement with the bar 6, thus leaving the feeding attachment free to be returned to normal position by the springs 19. The feeder then assumes the position shown in Fig. 1, and as the bar 6 moves forward on the ensuing working stroke of the plunger 5 the portion 22 of the connecting-rod 20 slides upward on the inclined surface of the latch and drops into engagement with the jaws 25 at the time the plunger reaches the limit of such movement. The feeder will then be operated on the following return stroke of the plunger to force another supply of hay into the mouth of the baling-chamber, as will be readily understood, the operation of htrowing the feeder into and out of action at proper periods being thereby automatically accomplished.

From the foregoing description, taken in connection with the accompanying drawings, the construction and mode of operation of the device will, it is thought, be readily understood without further description, and it will be seen that a simple construction of feeding mechanism is provided which is not liable to easily get out of order and which is controlled automatically by the movements of the plunger.

Having thus described the invention, what is claimed as new is—

1. In a baling-press, the combination of a compression-chamber, a reciprocating plunger operating therein, a swinging spring-retracted feeder, an operating connection therefor, a latch for coupling said connection to the plunger-rod, said latch and connection being automatically thrown into engagement when the plunger reaches the limit of its working stroke, and means for releasing the connection from engagement with said latch when the plunger reaches the limit of its return stroke.

2. In a baling-press, the combination of a compression-chamber, a reciprocating plunger operating therein, a spring-retracted feeder, and operating connections between the plunger and feeder, said connections being adapted to automatically connect the feeder for operation upon the return stroke of the plunger and to disconnect said feeder for return to normal position when the plunger reaches the limit of its return stroke.

3. In a baling-press, the combination of a compression-chamber, a reciprocating plunger operating therein, a swinging spring-retracted feeder, a connection for transmitting motion to the feeder, a latch upon the plunger-rod adapted to engage said connection when the plunger reaches the limit of its working stroke, and automatic means for releasing said connection from the latch to permit the feeder to return to normal position when the feeder reaches the limit of its return stroke.

4. In a baling-press, the combination of a compression-chamber, a reciprocating plunger operating therein, a swinging feeder, an operating connection therefor, a latch for engaging and coupling said connection to the plunger when the latter reaches the limit of its working movement, trip devices for throwing said connection out of engagement with the latch when the plunger reaches the limit of its return movement, and means in the path of movement of said trip devices for actuating the same.

5. In a baling-press, the combination of a compression-chamber, a reciprocating plunger operating therein, a swinging spring-retracted feeder, an operating connection therefor, a latch for coupling said connection to the plunger-rod when the plunger reaches the limit of its working stroke, one or more dogs for throwing said connection out of engagement with the latch when the plunger reaches the limit of its return stroke, and means for actuating the dogs.

6. In a baling-press, the combination of a baling-chamber, a swinging spring-retracted feeder, a reciprocating plunger operating in the compression-chamber, a swinging element for operating the feeder, a connection for actuating said feeding element, means for coupling said connection to the plunger-rod at the limit of the working stroke of the latter, and means for releasing said connection at the limit of the return stroke of the plunger.

7. In a baling-press, the combination of a compression-chamber having a hopper, of a yoke pivotally mounted upon the hopper, feeders carried by the yoke, spring means for retracting the yoke and feeders, a connecting-rod attached to the yoke, and means for throwing said connecting-rod into and out of engagement with the plunger-rod for operating and releasing the feeder at prescribed periods in the operation of the plunger.

8. In a baling-press, the combination of a compressing-chamber, a plunger operating therein, a yoke pivotally mounted upon the compression-chamber, a feeder carried thereby, one or more springs for retracting the yoke and feeder, a connecting-rod attached to the yoke, a latch for coupling said rod to the plunger-rod at the end of the working stroke of the latter, and means for releasing said connecting-rod when the plunger reaches the limit of its return stroke.

In testimony whereof I affix my signature in presence of two witnesses.

GILMAN V. DAVIS.

Witnesses:
M. R. SULLIVAN,
FRED H. SWINGLEY.